Nov. 12, 1968   R. G. WOOLWORTH   3,410,018
TACKLE BOX AND ROD PACK
Filed Dec. 6, 1966

United States Patent Office 3,410,018
Patented Nov. 12, 1968

3,410,018
TACKLE BOX AND ROD PACK
Richard G. Woolworth, Lancaster, Pa., assignor to Old Pal, Inc., Lititz, Pa.
Filed Dec. 6, 1966, Ser. No. 599,486
4 Claims. (Cl. 43—26)

This invention relates generally to boxes and more particularly to a box construction applicable to tackle boxes and the like.

Tackle boxes of different sizes and constructions are well known. These boxes generally have one or more trays which can be cantilevered. The trays are generally compartmented or divided by dividers for receiving small parts, such as screws, nuts in tool boxes and lures, flies and very small hooks etc. in tackle boxes. When these boxes are in use they provide a convenient storage and the parts therein are readily available. However, if the tackle box is to be used to transport a fishing rod then a separate rod pack must be provided to provide the necessary storage for the disassembled fishing rod. This rod pack is carried separately from the tackle box or otherwise carried therein in a loose condition making it readily possible for the loose rod pack to be damaged or for it to damage other contents of the tackle box.

It is a principal object of the present invention to provide a box construction usable for tackle boxes and the like in which the box is provided with its own cantilevered trays in the interior thereof and a separate rod pack is automatically releasably held in a fixed position within the box.

A feature of the invention is the provision of a box having an open utility tray and preferably a full-opening lid pivotally connected to the tray for opening and closing the utility tray. The box is provided with trays which are cantilevered to the lid so that the trays are automatically moved to a position in which they are housed in the box when the lid is closed and for moving them to a position out of the utility tray when the lid is opened a given extent. A fishing rod pack or case is provided for transportation thereof in the interior of the utility tray and is automatically releasably held in fixed position in the box by one of the cantilevered trays in the box.

Another feature of the invention is the provision of tabs, cooperative with the cantilevered trays, which are part of the rod pack for holding the rod pack in a set position in the tackle box. The individual tabs of the rod pack are disposed for cooperating with an edge of one of the trays.

Another feature is the provision of automatic lock means for automatic control of the effective locking and clamping in a set position of the rod pack and automatic rendering of the lock means ineffective for removal of the rod pack when the box is in an open condition.

Other features and advantages of the box in accordance with the present invention will be better understood as described in the following specification and claims, in conjunction with the drawings in which:

Figure 1:
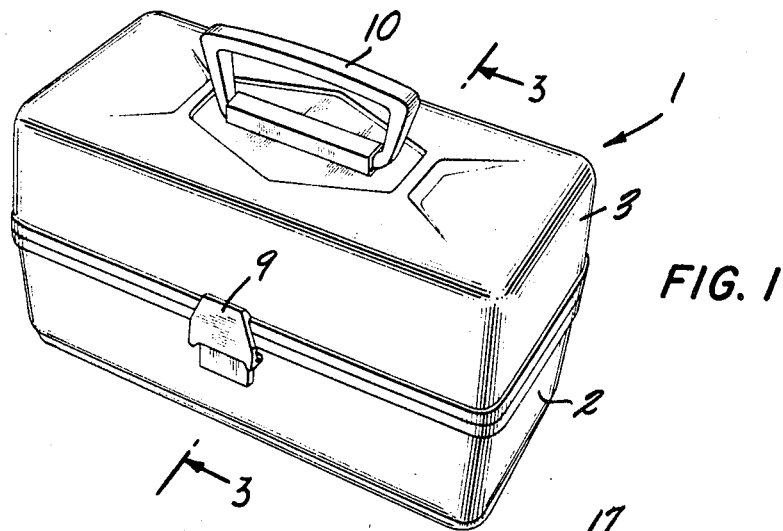
FIG. 1 is a perspective view of a box according to the invention illustrated in a closed condition.

While the invention will be illustrated and described as applied to a tackle box, it will be understood that the invention is equally applicable to tool boxes and the like of various sizes and can be made of different suitable materials.

According to the drawing the invention comprises a tackle box 1 comprising means defining a bottom half 2 on which is pivotally mounted a lid 3 for opening and closing the bottom half and jointly therewith defining the box. Hinge means 4 are provided on the box pivotally connecting the lid 3 to the bottom half 2. The hinge is preferably constructed so that the lid is a full-opening lid which permits the box to sit solid when open. The box parts heretofore described may be made of any suitable material, for example a tough, high impact polystyrene or other suitable plastic which will not chip, dent, crack or corrode and may be ornamentally colored. Those skilled in the art understand that the bottom 2 of the box is described as a bottom half but this is not restricted to mean that the lid and the lower part 2 are of equal height. The upper and lower parts need not be true halves and the terms bottom half and upper half encompass all possible relative dimensions between the parts 2 and 3.

The bottom half and lid 3 are preferably provided with watertight edge constructions along the individual cooperating edges 5, 6. The box is provided with a spill-proof lock or safety latch assembly 9 for example, according to the United States Patent 3,134,617 by which the box can be locked in a closed condition. The lid is provided with a handle 10 for transporting the tackle box and operating the lid 3 to an open and closed condition.

The box bottom 2 is a large open utility tray when the box is in an open condition and is provided with a plurality of cantilevered trays comprising a lower tray 15 pivotally mounted on the bottom half with cantilevers on both ends thereof, for example cantilevers 20, 21 and cantilevered to the lid with cantilevers, for example a cantilever 24. Upper trays 16, 17 are mounted on the lowermost tray 15 with pairs of cantilevers 26, 27, 28 and 29. These trays may be actuated to a position illustrated in FIG. 2 allowing access to the interior thereof when the box is opened.

Figure 2:
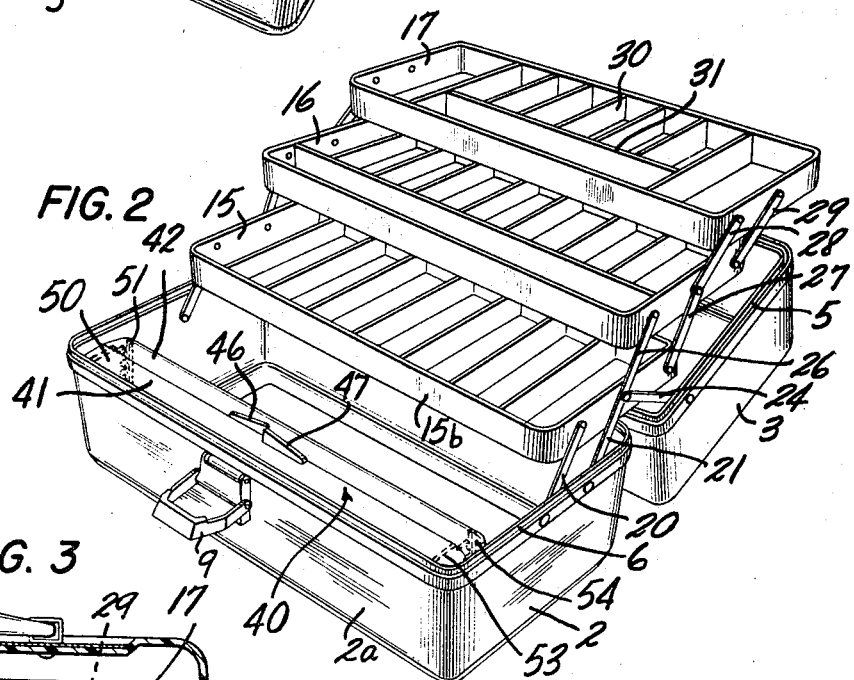
FIG. 2 is a perspective view of the box in FIG. 1 in an open condition.

It will be understood that the box is provided with cantilevers which are mounted on both ends of the trays as illustrated and better seen on one end in FIG. 2. The cantilevers have the strength to support the trays in an open position to which they are actuated automatically by the lid 3 when opened to an open position and securely mounted and held within the box and actuated to a position in which they are housed within the box when the lid 3 is closed. The cantilevers are preferably made of a material that will not corrode or are protected or coated against environmental conditions encountered in use.

The individual trays are preferably compartmented as shown in FIG. 2, for example with a plurality of dividers 30, 31 spaced along the length of the trays to define therein selected different sizes of compartments for receiving flies.

The invention provides a fishing rod pack or case 40 made of two halves 41, 42 hinged by a plurality of hinges, for example a hinge 43, and provided with tabs 46, 47 for locking the rod pack closed. The rod pack 40 is of an overall length less than the longitudinal dimension or length of the bottom half 2 of the tackle box 1. Each of the rod case halves is provided with an inwardly extending projection 50, 51 at one end and another projection 53, 54 at an opposite end. One set of the projections 50, 53 are provided with side-by-side recesses such as a recess 55 for receiving the various disassembled sections of a fishing rod, not shown, extending longitudinally of the rod pack. The interior edges of the projections 51, 54 are each provided with a thin resilient padding 57 for clamping the rod ferrules between it and the respective projections having the recesses. The rod, for example a fiberglass rod, is then well protected.

Figure 3:
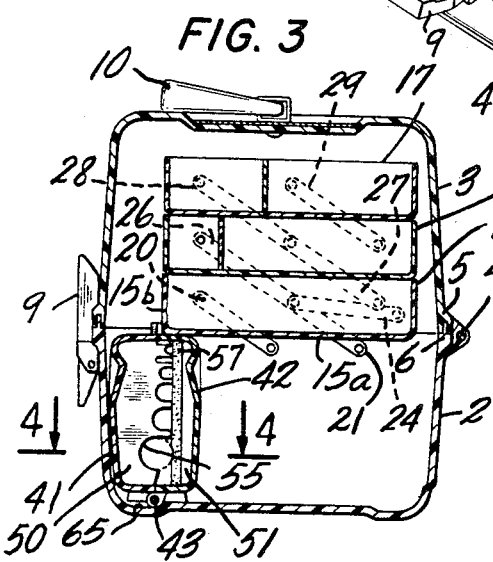
FIG. 3 is a cross section view taken on line 3—3 of FIG. 1, illustrating the internal arrangement of a box and rod pack according to the invention.
Figure 4:
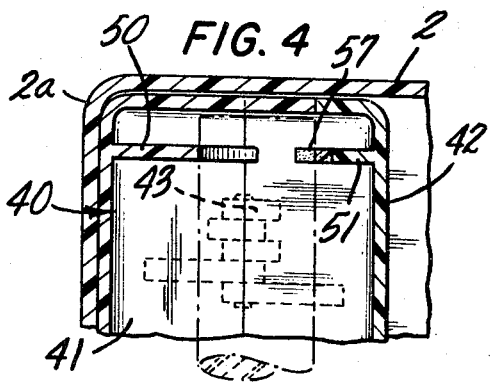
FIG. 4 is a fragmentary section view of a part of the box in FIG. 3, illustrating details of a rod pack housing in the box.

The rod pack 40 is releasably mountable in a position, illustrated in FIGS. 2 and 3, extending longitudinally of the tackle box lower half 2 and adjacent a front wall 2a of the bottom half with the hinge means 43 received in a recess 65 formed in the bottom half. The recess 65 extends the length of the lower half 2 and is an offset generally formed in a tackle box. In this position the lower tray 15 has its bottom surface 15a overlying a part of the rod pack as illustrated in FIG. 3 when the lid is in a closed condition. With the rod pack in this position the tabs 46, 47 cooperate with a front longitudinal edge 15b of the lower tray to preclude any movement of the rod pack crosswise of the tackle box while the overlying lower surface of the bottom tray precludes any upward movement or movement normal to the tray bottom surface. The hinge means bear against the bottom of the tackle box.

Thus the rod pack is releasably held in a fixed position by the lower tray cooperating with the tabs when the lid is closed and is automatically released for easy removal when the tackle box is opened in the position illustrated in FIG. 2. The cantilever trays travel in a trajectory in which the rod pack or case 40 is automatically locked and released by the simple movement of the lid to an open or closing position.

Those skilled in the art will understand that the invention provides a tackle box and rod pack which cooperate for easy storage and transport of a fishing rod and cooperate in precluding the rod pack from simply being loose in the tackle box and thereby protect the rod pack, the fishing rod therein, and any other articles being transported in the box.

Further those skilled in the art will understand that the rod pack can be made of any suitable material, such as plastic, and that the principles of the invention are applicable to tool box constructions and the like.

Moreover, the box can be constructed with a single cantilevered tray comparable to the tray 15 or can be constructed with even a larger number of trays than three in a construction similar to that illustrated in the drawing.

What I claim and desire to be secured by Letters Patent is:

1. In a box, means defining a bottom half of said box, a lid pivotally mounted for opening and closing said bottom half and jointly therewith defining said box, at least one cantilevered tray in said box, means cantilevering said cantilevered tray for automatically moving the cantilevered tray to a position in which said cantilevered tray is housed in said box when the lid is closed from an open position and for moving it to a position out of said box when the lid is opened a given extent, a rod pack removably held in said bottom half by said cantilevered tray, means on said rod pack cooperative with said cantilevered tray for automatically releasing said rod pack when said lid is opened and automatically holding said rod pack in fixed position in the interior of said bottom half when the lid is closed.

2. In combination, means defining a bottom half of a tackle box, a lid pivotally mounted for opening and closing said bottom half thereby jointly therewith defining said tackle box, at least one tray in said tackle box, means connected to said tray and to said lid for automatically moving said one tray to a position in which said one tray is housed in said tackle box when the lid is closed from an open position and for moving it automatically to a position at least partially out of said bottom half when the lid is opened a given extent, and a rod pack for use in said tackle box for carrying and transporting therein a disassembled fishing rod and positionable in the interior of said tackle box in a given position and having means cooperative with said one tray for releasably fixing said rod pack in said given position when said lid is in a closed condition.

3. In the combination according to claim 2, in which said rod pack comprises a pair of tabs for locking thereof, said rod pack having an overall length less than the length of said bottom half, said given position of said rod pack comprising a position in which said rod pack is disposed extending lengthwise of said bottom half with said tabs disposed in position for cooperating with a longitudinal edge of said one cantilever tray, said cantilever tray having a bottom surface overlying said rod pack when said lid is closed to keep it from moving in a direction normal to said bottom surface, said edge of said container cooperating with said tabs when said lid is closed to preclude said rod pack from movement in a direction crosswise of said bottom half.

4. In the combination according to claim 3, in which said rod pack comprises means interiorly thereof for supporting a plurality of disassembled fishing rod sections extending longitudinally thereof in a condition suspended by ferrules of said fishing rod sections and with portions of said rod sections between the respective ferrules free of contact with said rod pack.

References Cited

UNITED STATES PATENTS

| | | | |
|---|---|---|---|
| 1,790,498 | 1/1931 | Dewey | 206—16 |
| 2,131,408 | 9/1938 | Murrer | 206—16 X |
| 2,501,270 | 3/1950 | Fleming | 206—16 |
| 2,650,449 | 9/1953 | Suring | 43—26 |
| 2,816,390 | 12/1957 | Vaughn et al. | 43—26 |
| 3,348,329 | 10/1967 | Seemann | 43—26 |

SAMUEL KOREN, *Primary Examiner.*

D. J. LEACH, *Assistant Examiner.*